US012079981B2

(12) United States Patent
Sawal et al.

(10) Patent No.: US 12,079,981 B2
(45) Date of Patent: Sep. 3, 2024

(54) HYBRID DEEP LEARNING FOR ANOMALY DETECTION

(71) Applicant: DELL PRODUCTS L.P., Round Rock, TX (US)

(72) Inventors: Vinay Sawal, Fremont, CA (US); Per Henrik Fremrot, Novato, CA (US); Sithiqu Shahul Hameed, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 392 days.

(21) Appl. No.: 17/362,970

(22) Filed: Jun. 29, 2021

(65) Prior Publication Data

US 2022/0392056 A1     Dec. 8, 2022

(30) Foreign Application Priority Data

Jun. 4, 2021    (IN) .............................. 202111024969

(51) Int. Cl.
     *G06T 7/00*           (2017.01)
     *G06F 16/901*      (2019.01)

(52) U.S. Cl.
     CPC ........ *G06T 7/0008* (2013.01); *G06F 16/9024* (2019.01); *G06T 2207/10081* (2013.01); *G06T 2207/10116* (2013.01); *G06T 2207/20081* (2013.01); *G06T 2207/20084* (2013.01)

(58) Field of Classification Search
     CPC ......... G06T 7/0008; G06T 2207/10081; G06T 2207/10116; G06T 2207/20081; G06T 2207/20084; G06F 16/9024
     See application file for complete search history.

(56) References Cited

U.S. PATENT DOCUMENTS

2020/0193589 A1\*   6/2020   Peshlov ............... G06V 10/955

OTHER PUBLICATIONS

Pu C, Huang H, Luo L. Classfication of hyperspectral image with attention mechanism-based dual-path convolutional network. IEEE Geoscience and Remote Sensing Letters. Mar. 30, 2021;19:1-5. (Year: 2021).\*
Lau, Remy, A Unified View of Graph Neural Networks, Jun. 26, 2021, Towards Data Science, pp. 1-9; (Year: 2021).\*
Zhu, Y., Zha, Z. J., Zhang, T., Liu, J., & Luo, J. (Oct. 2020). A structured graph attention network for vehicle re-identification. In Proceedings of the 28th ACM international conference on Multimedia (pp. 646-654). (Year: 2020).\*

\* cited by examiner

*Primary Examiner* — David Perlman
(74) *Attorney, Agent, or Firm* — North Weber & Baugh LLP (57) ABSTRACT

Hybrid deep learning systems and methods allow for detecting anomalies in objects, such as electrical printed circuit board (PCB) components, based on image data. In one or more embodiments, a hybrid deep learning model comprises a Graph Attention Network (GAT) that uses spatial properties of the PCB components to extract latent semantic information and generate an output set of hidden representations. The GAT treats each of the electrical components as a node and each connection between them as edges in a graph. The hybrid system further comprises a Convolutional Neural Network (CNN) that uses pixel data to obtain its own output set of hidden representations. The hybrid deep learning model concatenates both sets to detect anomalies that may be present on the PCB.

20 Claims, 5 Drawing Sheets

HYBRID DEEP LEARNING FOR ANOMALY DETECTION

CROSS-REFERENCE TO RELATED APPLICATION

This patent application claims priority benefit under 35 USC § 119 to the Indian Patent Application Number 202111024969, filed in the Indian Patent Office on 4 Jun. 2021, entitled "HYBRID DEEP LEARNING FOR ANOMALY DETECTION," and listing Vinay Sawal, Per Henrik Fremrot, and Sithiqu Shahul Hameed as inventors, which patent document is incorporated by reference herein in its entirety and for all purposes.

BACKGROUND

A. Technical Field

The present disclosure relates generally to information handling systems for machine-learning applications. More particularly, the present disclosure relates to deep learning models comprising hybrid architectures for anomaly detection and other applications.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In today's global economy most hardware manufacturing occurs predominantly at large Original Design Manufacturers (ODMs) and Contract Manufacturers (CMs). The supply chain is complex with hardware components being sourced, manufactured, and assembled by a large number of vendors and sub-contractors.

Several real and theoretical security threats have been identified involving a malicious actor who, somewhere in a supply-chain, replaces a hardware component with a compromised one. As an example, a passive EMI filter may be manipulated by adding an electronic circuit that transforms an otherwise passive device into an active one. The compromised filter may then be placed on a USB serial console to eavesdrop on confidential information that may be extracted from return merchandize authorization units or uploaded to a remote server, e.g., by injecting shell commands. The functions of devices that have been tampered with in this way may vary from enabling remote access and spying by adversaries to implanting time-bombs, i.e., component self-destruction tools.

Conventional countermeasures that attempt to mitigate such security threats suffer from several shortcomings, including being physically destructive (cross-sectioning, decapsulation), using a limited set of random samples, evaluating limited datasets in isolation, and often requiring time-consuming and expensive manual interpretation of results. Some of these methods include stand-alone Automated Optical Inspection (AOI) and 2D/3D X-ray methods as unrelated manufacturing tests that are optimized mainly for detecting manufacturing defects. Such methods have limited rough device detection capability and may involve destructive sample testing. Existing Deep Learning based AOI systems and conventional Convolutional Neural Network (CNN)-based techniques use extremely deep levels of hidden layers, e.g., 150 or more hidden layers. These types of networks take a long to time train, suffer from high variance (over-fitting), and are subject to the law of diminishing returns.

Accordingly, it is highly desirable to find new, more efficient, scalable, non-destructive, and sensitive solutions to automatically detect anomalies and/or to automatically detect and expose security breaches in various applications.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably.

Various embodiments herein combine a CNN and a GAT in a hybrid deep-learning based binary classification techniques to automatically detect the presence of anomalous components in an assembled printed circuit board (PCB)'s electrical design. GATs utilize the concept of convolutions on a graph by aggregating local neighborhood information using multiple filters to extract high level representations in the graph. GATs further exploit the spatial properties of damage and use latent semantic feature extraction, e.g., by using link prediction techniques and principles using Degree (In-degree, Out-degree, Jaccard's Coefficient), Edge Link (Adamic-Adar Index, Preferential Attachment score), Centrality measure (In-degree, Out-degree), and/or Composite (Strongly-connected components (SCC), Weakly-connected components (WCC)).

It shall be noted that although embodiments herein may be described within the context of detecting security breaches in hardware designs, aspects of the present disclosure are not so limited. Accordingly, the aspects of the present disclosure may be applied or adapted for use in other contexts. For example, various embodiments may be used to detect any type of anomaly in various types of datasets that lend themselves as being expressed as structured graphs of networks.

Figure 1:
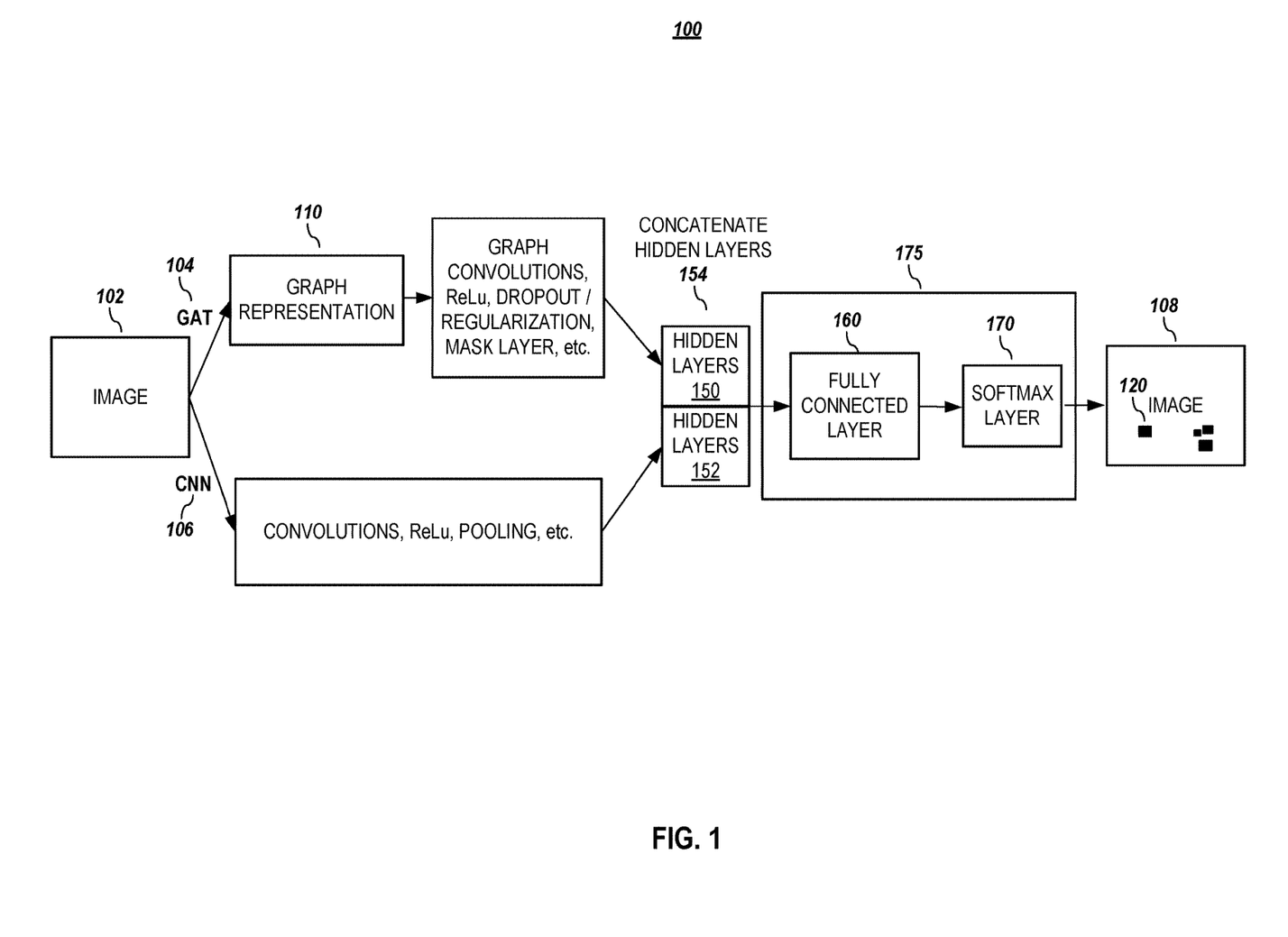
FIG. 1 ("FIG. 1") depicts an exemplary hybrid deep learning model comprising a hybrid Graph Attention Network (GAT)-CNN architecture for detecting an anomaly according to embodiments of the present disclosure.

FIG. 1 depicts an exemplary hybrid deep learning model comprising a hybrid GAT-CNN architecture for detecting an anomaly according to embodiments of the present disclosure. In one or more embodiments, model 100 comprises input image 102, GAT path 104, CNN path 106, and output image 108. Input image 102, which comprises electrical PCB components, is provided to model 100 as input image data that is fed into both GAT path 104 and CNN path 106 that each represents its own model.

In one or more embodiments, GAT path 104 comprises a GAT model that uses spatial properties of the components in input image 102 to extract latent semantic information, e.g., in the form of a feature matrix that may be obtained from graph representation 110, as discussed in greater detail with reference to FIG. 2. The GAT model may be used to obtain an output set of hidden representations 150. Similarly, CNN path 106 comprises a CNN model that processes input image 102 as pixel data and that may be used to obtain an output set of hidden representations 152. In one or more embodiments, the CNN model may have been trained using pixel data from component sub-images (not shown).

In one or more embodiments, the model in GAT path 104 may treat each of the components on the circuit board as a node and further treat connections between components as undirected edges. It is understood that a component may be comprised of any number of sub-components that may be treated as nodes and that may have internal connections that may be treated as edges, thus, enabling the detection of internal component manipulations. In one or more embodiments, the model may establish additional neighbor relationships between the nodes, e.g., by considering proximity to other nodes. Filters or kernels may be used to aggregate local neighborhood information. In one or more embodiments, this information may be used to extract high level representations of the components in a graph, which may have arbitrary structures, to obtain spatial properties of the components on the PCB. The spatial properties of components may then be used to extract latent semantic information, and a graph convolution with multi-head attention may be used to perform link prediction and node detection. Pixel values from PCB image and a 2D/3D convolution pipeline may be used to determine an anomaly.

In one or more embodiments, the model in CNN path 106 may use pixel data from input image 102, e.g., a two-dimensional (2D) PCB surface image in visible light spectrum (AOI), a 2D X-ray image of sub-surface layers of a PCB, or a three-dimensional (3D) tomograph of 2D images generated using computer-aided tomography or similar automated X-ray inspection tools, to perform a 2D or 3D convolution operation to obtain output set of hidden representations 152.

As depicted in FIG. 1, in one or more embodiments, model 100 may combine the two output sets of hidden representations 150 and 152 associated with respective GAT path 104 and CNN path 106 to obtain a concatenated output set of representations 154 that allows for non-linear activation and aggregation. In one or more embodiments, concatenated output set of representations 154 may serve as input to a neural network 175 comprising fully connected layer 160 and softmax layer 170, which may be applied to provide a probability distribution for each category for the component anomaly assessment.

As shown in FIG. 1, generated output image 108 may comprise any number of markers (e.g., 120) that indicate the presence and locations of detected component anomalies in the PCB. It is understood that markers (not shown) that indicate the absence of an anomaly may also be generated and used. A categorical cross-entropy loss function may then be minimized across different categories, such as, e.g., anomalous, partially anomalous, and non-anomalous to train the weights of the GAT and CNN models.

In one or more embodiments, by combining the predictions from pixel-based convolutions and graph-based convolutions, significantly better performance may be achieved when compared to that of individual techniques. Formally, the combination may be expressed as a model $y_i=f(x_i, v_i)$, where $y_i \in \{0, 1\}$ corresponds to respective anomalous and non-anomalous categories.

In one or more embodiments, by utilizing the spatial features in addition to pixel data from the images, the hybrid CNN-GAT based classification is far more superior than conventional CNN-based techniques since it uses latent semantic node features in conjunction with CNN technique. By not using a very deep hidden network, advantageously, the time to train hybrid model 100 is significantly less than that of conventional CNN models. In addition, by not having to use a relatively large number of hidden layers, model 100 does not suffer from high variance (over-fitting).

Overall, building a deep learning model by extracting latent spatial features in addition to pixel data from images to create a hybrid model that concatenates a GAT model and a CNN model, produces a superior system that requires less compute, memory, and time resources when compared to conventional models.

In detail, in one or more embodiments, for GAT path 104, a set of K images may be represented as $S=\{s_1, s_2, \ldots s_k\}$ where each image has a varying number n of component sub-images $\{x_1, x_2, \ldots x_n\} \in s_i$ of varying sizes.

$G=(V, E)$ is a graph structure where each node $v_i \in V$ may correspond to an $x_i$ component sub-image, and each edge $e_{ij} \in E$ may represent where components $v_i$ and $v_j$ occur within a predefined threshold in image $s_k$. Each node $v_i$ may be defined by m features $\{h_1, h_2, \ldots h_m\}$ such that $v \in \mathbb{R}^m$.

In one or more embodiments, a graph convolutional layer may compute a set of new node features $\{h_1', h_2', \ldots h_m'\}$ based on the input feature and a node-wise feature transformation weight matrix W. This transforms the feature vectors into:

$$g_i = W \cdot h_i$$

In one or more embodiments, to aggregate features across neighborhoods, $N_i$ may be defined as the neighborhood of node i comparing all first-order or first-order and second-order neighbors of i. Thus, node features may be defined as non-linear activation over the aggregated weighted sum of feature vectors of a given node. Formally, this may be expressed as:

$$h_i' = \sigma(E_{j \in N} a_{ij}(g_j))$$

where the weighting factor, $a_{ij}$, represents the significance of node j's features to node i, and σ represents a non-linear activation function.

In one or more embodiments, self-attention may be used to determine the weighting factor $\alpha_{ij}$ for each node such that it is a product of attention computed across pairs of nodes i and j based on their features. For each node i, one should attend over all nodes in that node's neighborhood, e.g., first-order neighbors, or first-order and second-order neighbors. The values may then be normalized to be relatable across different neighborhoods.

Further, regularization may be applied to obtain better efficiency and stability, e.g., by replicating the operations of each layer two or three times with different parameters, each time and aggregating them. Formally, this may be expressed as:

$$h_i' = AGG(\sigma(\Sigma_{j \in N} a_{ij}^1(g_i^1), \Sigma_{j \in N} a_{ij}^2(g_i^2), E_{j \in N} a_{ij}^3(g_i^3)))$$

In one or more embodiments, to avoid too much attention to some weighting factors $\alpha_{ij}$ that may cause the GAT to overfit to certain samples, dropout techniques may be employed to mitigate the high variance.

In one or more embodiments, an Adjacency Matrix $\hat{A}$ ($\hat{A} \in \mathbb{R}^{n \times n}$) may be created to represent the graph G as an n×n matrix, where n is the number of nodes in G. A Degree Matrix D ($D \in \mathbb{R}^{n \times n}$), e.g., an n×n Identity matrix, may represent the degree of each node in graph G. $\hat{A}$ may be normalized with D to build a GAT Normalized Adjacency Matrix, A, using the following formula:

$$A = D^{-1/2} \cdot \hat{A} \cdot D^{-1/2}$$

In one or more embodiments, the feature vectors may be stacked to create a Feature Matrix X (where $X \in \mathbb{R}^{n \times d}$) that may represent all features of all nodes. In one or more embodiments, the feature matrix X may be fed to GAT path 104 (shown in hybrid model 100 in FIG. 1) that may be represented as:

$$GAT = AGG(h_u^{k-1}, \forall u \in N(V_i))$$

Figure 2:
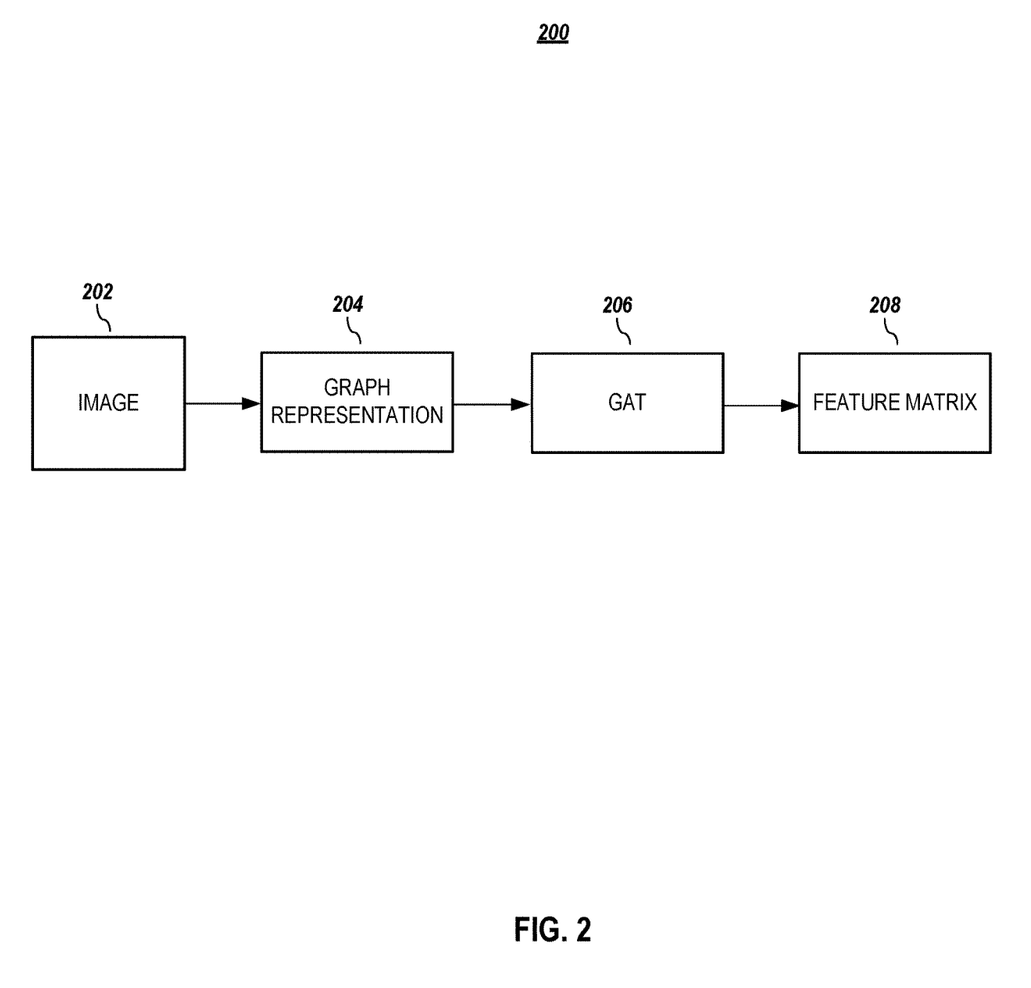
FIG. 2 is a pictorial illustration of a feature generation pipeline according to embodiments of the present disclosure.

FIG. 2 is a pictorial illustration of a feature generation pipeline according to embodiments of the present disclosure. As depicted, feature generation pipeline 200 comprises image 202, graph representation 204, GAT 206, and feature matrix 208, which may comprise w features for a set of n nodes.

Graph representation 204 may be generated by using any graph layout generation software known in the art. In one or more embodiments, graph representation 204 may utilize recursive feature extraction. Generation pipeline 200 may end by creating feature matrix 208 that may serve as input data for the hybrid model discussed with reference to FIG. 1.

Returning to FIG. 1, in one or more embodiments, in order to ensure that activations of $v_i$ and their neighbor(s) u are concatenated with the CNN feature map corresponding to $v_i$, a mask function may be added. An exemplary mask function may simply comprise the row of the Normalized Adjacency Matrix $A_{vi,:}$ pertaining to $v_i$.

$$GAT = A_{vi,:} ReLU(A \cdot ReLU(A \cdot XW_{k-1})W_k)$$

where A represents the normalized Adjacency Matrix described in FIG. 1, X represents the feature matrix described in FIG. 1, and ReLU represents a non-linear activation function.

Finally, the hybrid model that combines GAT path 104 and CNN path 106 may be represented as:

$$y_i = f(x_i, v_i) = f(W_k \cdot \sigma([W_{k-1} \cdot AGG(h_u^{k-1}, \forall u \in N(V_i)), C^{k-1}(x_i)]))$$

where u represents nearest neighbors of v, AGG represents GAT component of the model, $C^{k-1}$ represents CNN component of the model, a represents dense layer concatenation of GAT and CNN components, W represents trainable parameters of the model, and $y_i \in \{0, 1\}$ corresponds to prediction for respective non-anomaly and anomaly categories.

In one or more embodiments, GAT path 104 and CNN path 106 may be concurrently trained, e.g., by using pixel data from component sub-images $x_i$. In one or more embodiments, transfer learning may be leveraged using an existing model that may have been trained on a commonly available dataset. For example, in one or more embodiments, a lower half of the model's weights may be frozen to take advantage of low-level feature maps including edges that distinguish between different objects. The upper portion may be trained to provide feature maps specific to components.

Further, in one or more embodiments, to mitigate unbalanced data sets, data points may be weighted as an inverse of the number of samples available per class in the cost function to provide more significance to sparse classes. Furthermore, data augmentation may be performed, e.g., with each data point focused on image properties inherent within the imagery data, e.g., horizontal and vertical flip, or height and width shift. It is understood that in order to improve training time, to mitigate over-fitting, batch normalization may be used on convolutional layers, while dropout may be used on dense layers.

In one or more embodiments, the GAT 104, CNN 106, and the head/classification model 175 may be trained end-to-end as a complete system. Alternatively, at least the GAT and CNN models may be pre-trained or trained separately, and head model 175 may be subsequently trained with the GAT and CNN models in which the GAT model, the CNN model, or both have their parameters fixed, or alternatively, may be fine-tuned as part of the training. Training may be performed until a stop condition has been reached.

Figure 3:
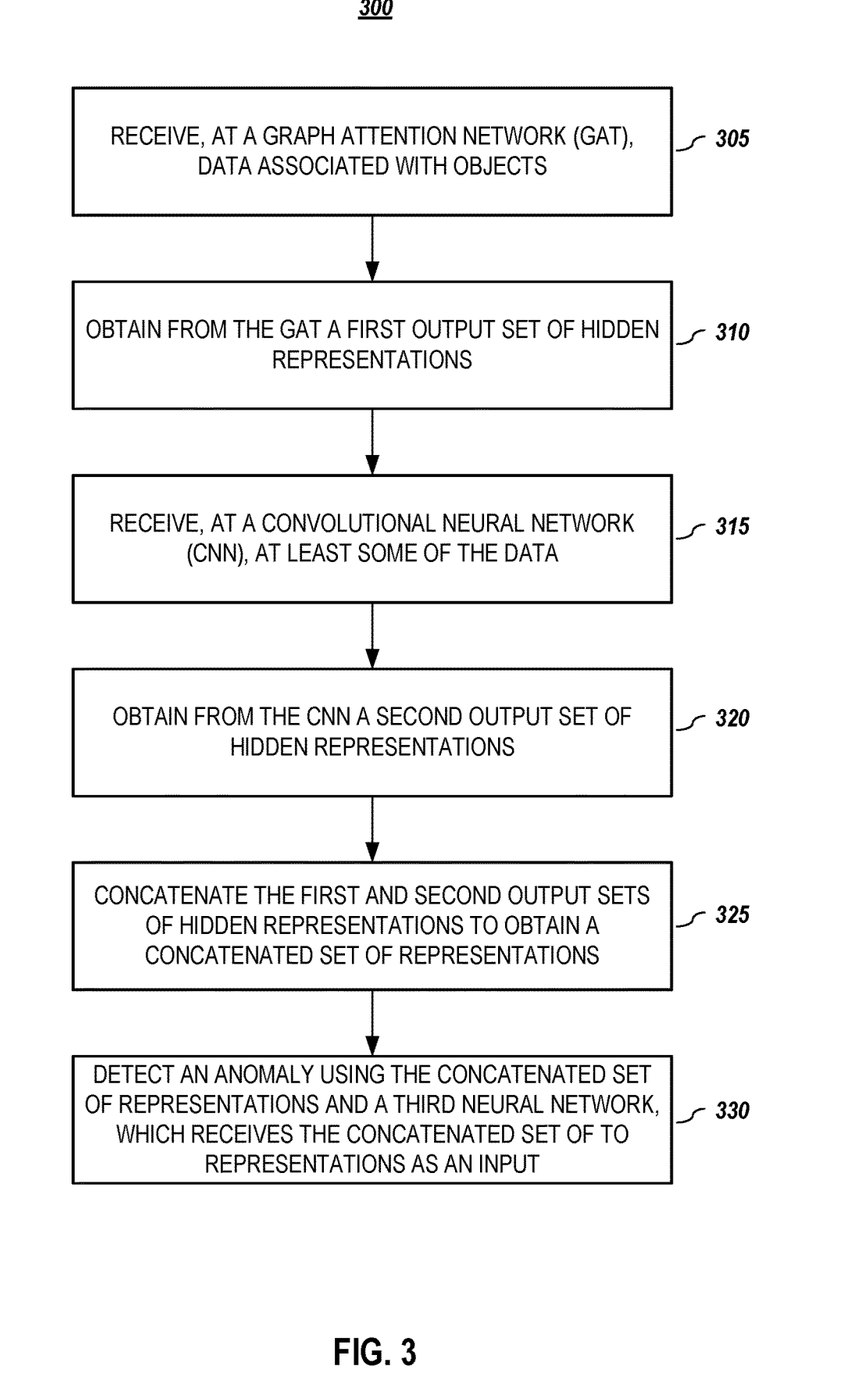
FIG. 3 is a flowchart for using a hybrid deep learning model to detect an anomaly according to embodiments of the present disclosure.

FIG. 3 is a flowchart for using a hybrid deep learning model to detect an anomaly according to embodiments of the present disclosure. In one or more embodiments, process 300 for using a hybrid deep learning model to detect an anomaly may begin when, at a GAT, data associated with objects is received (305). A first output set of hidden representations may be obtained (310) from the GAT. In response to a CNN receiving (315) at least some of the data, a second output set of hidden representations may be obtained (320) from the CNN. The hybrid deep learning model may concatenate (325) the first and second output sets of hidden representations to obtain a concatenated set of representations. Finally, the CNN may detect (330) an anomaly using the concatenated set of representations and, e.g., a third neural network that receives the concatenated set of representations as an input. An exemplary application for anomaly detection is presented in FIG. 4.

Figure 4:
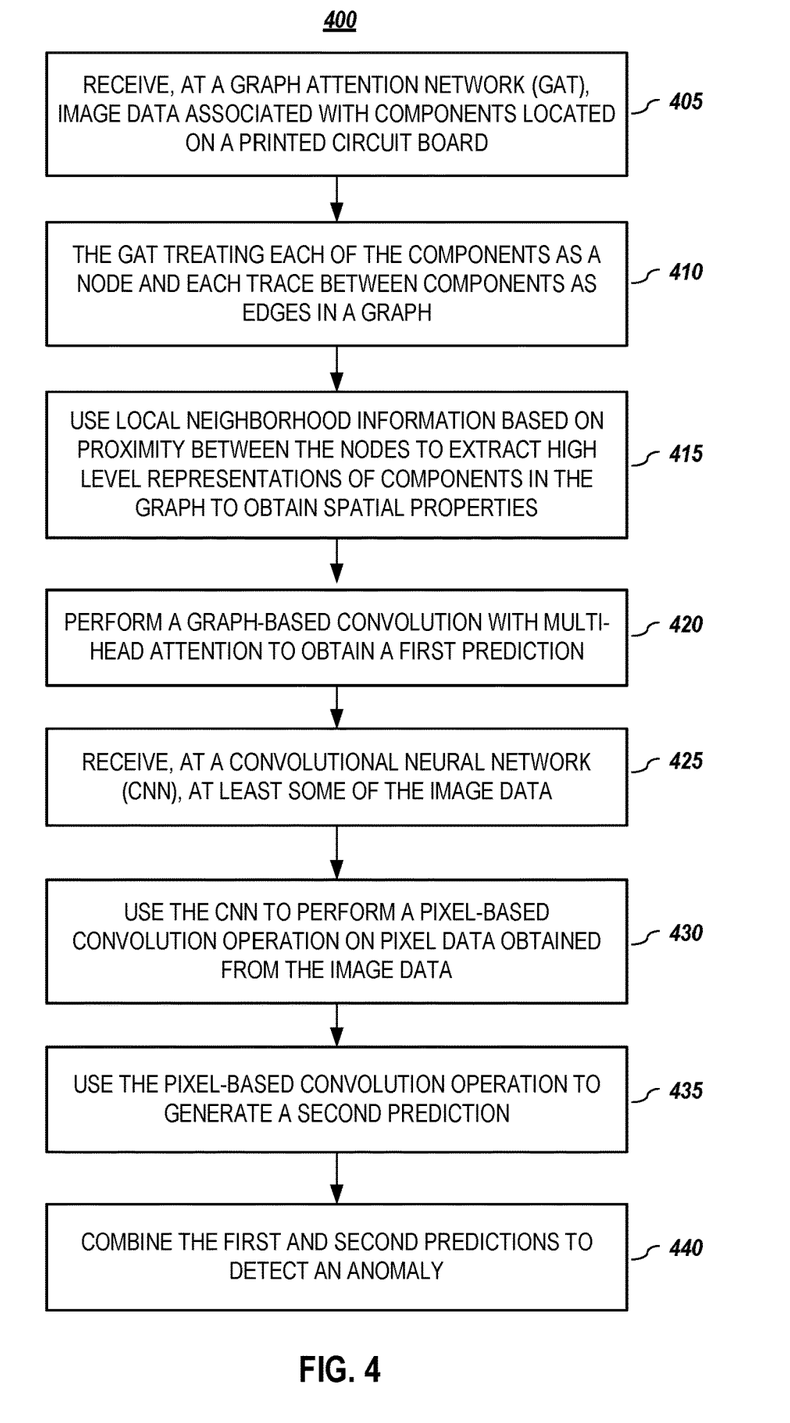
FIG. 4 is a flowchart for using a hybrid deep learning model to detect an anomaly in an image according to embodiments of the present disclosure.

FIG. 4 is a flowchart for using a hybrid deep learning model to detect an anomaly in an image according to embodiments of the present disclosure. In one or more embodiments, process 400 for detecting an anomaly in an image by using a GAT path and a CNN path may begin when image data associated with electrical components that are located on a circuit board is received (405) at the GAT. The GAT may treat (410) electrical components as nodes in a graph and may further treat traces between electrical components as edges in the graph.

In one or more embodiments, the GAT may use local neighborhood information that is based on proximity between the nodes to extract high level representations of the components in the graph to obtain (415) spatial properties of the components and perform graph-based convolutions (420) with multi-head attention to option a prediction based on the graph-based convolutions. In the CNN path, the hybrid deep learning model may receive (425), at the CNN at least some of the image data, e.g., pixel data, and perform pixel-based convolutions (430).

Finally, the hybrid deep learning model may use the pixel-based convolution to generate (435) a second prediction and concatenate (440) the two predictions to obtain to detect the anomaly, e.g., by using the concatenation as an input to a neural network in the hybrid deep learning model. As a person of skill in the art will appreciate, any type of concatenation may be used.

It shall be noted that: (1) certain steps may optionally be performed; (2) steps may not be limited to the specific order set forth herein; (3) certain steps may be performed in different orders; and (4) certain steps may be done concurrently.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 5:
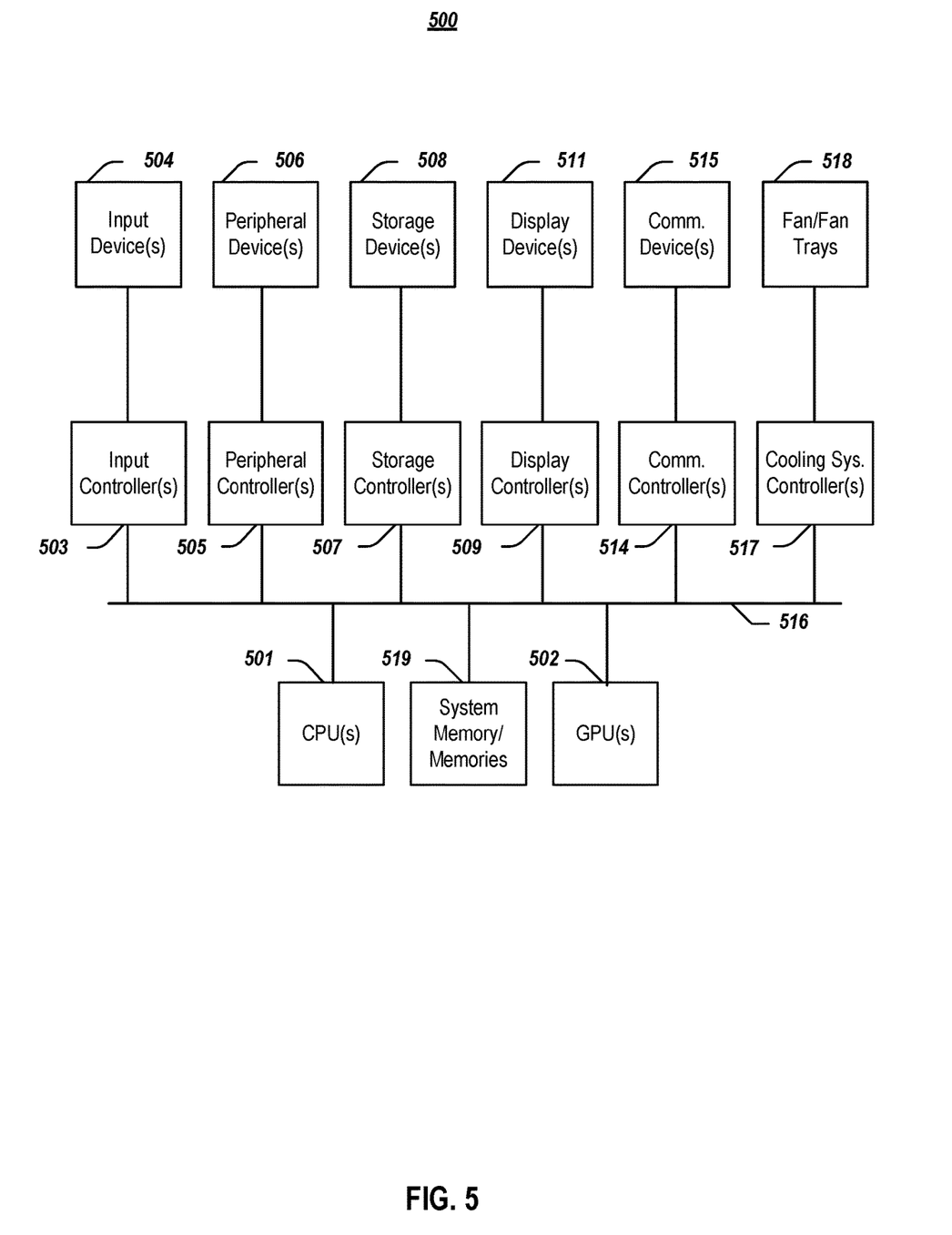
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPUs) 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs and holographic devices; magneto-optical media; and hardware devices that are specially configured to store or to store and execute program code, such as ASICs, PLDs, flash memory devices, other NVM devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for detecting an anomaly, the method comprising:
   receiving, at a Graph Attention Network (GAT), data associated with objects, the GAT
   threating each of the objects as a node, treating connections between objects as edges in a graph, and performing a graph-based convolution using multi-head attention;
   obtaining from the GAT a first output set of hidden representations;
   receiving, at a Convolutional Neural Network (CNN), at least some of the data;
   obtaining from the CNN a second output set of hidden representations;
   concatenating the first and second output sets of hidden representations to obtain a concatenated set of representations; and detecting whether an anomaly exists using the concatenated set of representations and a third neural network, which receives the concatenated set of representations as an input.

2. The method according to claim 1, wherein the data comprises at least one of a 2D surface image, a 2D X-ray image comprising sub-surface layers, and a 3D tomograph of 2D images generated using computer-aided tomography.

3. The method according to claim 1, wherein the GAT uses local neighborhood information that is based on proximity between the nodes to extract high level representations of the objects in the graph to obtain spatial properties of the objects.

4. The method according to claim 3, wherein the GAT establishes neighbor relationships between the nodes by using filters to aggregate the local neighborhood information.

5. The method according to claim 1, wherein the GAT obtains a link prediction, a node detection, or both.

6. The method according to claim 1, wherein the CNN uses the data to perform a pixel-based convolution operation.

7. The method according to claim 1, wherein the CNN has been trained using pixel data from sub-images.

8. A system for detecting an anomaly, the system comprising:
one or more processors; and
a non-transitory computer-readable medium or media comprising one or more sets of instructions which, when executed by at least one of the one or more processors, causes steps to be performed comprising:
receiving, at a Graph Attention Network (GAT), data associated with objects, the GAT treating each of the objects as a node, treating connections between objects as edges in a graph, and using local neighborhood information that is based on proximity between the nodes to extract high level representations of the objects in the graph to obtain spatial properties of the objects;
obtaining from the GAT a first output set of hidden representations;
receiving, at a Convolutional Neural Network (CNN), at least some of the data;
obtaining from the CNN a second output set of hidden representations;
concatenating the first and second output sets of hidden representations to obtain a concatenated set of representations; and
detecting whether an anomaly exists using the concatenated set of representations and a third neural network, which receives the concatenated set of representations as an input.

9. The system according to claim 8, wherein the data comprises at least one of a 2D surface image, a 2D X-ray image comprising sub-surface layers, and a 3D tomograph of 2D images generated using computer-aided tomography.

10. The system according to claim 8, wherein the objects are at least one of components on a printed circuit board or sub-components within components on the printed circuit board, and connections between the components or sub-components are traces.

11. The system according to claim 8, wherein the CNN performs a pixel-based convolution operation on pixel data obtained from the data.

12. The system according to claim 8, wherein the GAT objects obtains a link prediction, a node detection, or both.

13. The system according to claim 12, wherein the GAT establishes neighbor relationships between the nodes by using filters to aggregate the local neighborhood information.

14. A non-transitory computer-readable medium or media comprising one or more sequences of instructions which, when executed by at least one processor, causes steps to be performed comprising:
receiving, at a Graph Attention Network (GAT), data associated with objects, the GAT treating each of the objects as a node, treating connections between objects as edges in a graph, and performing a graph-based convolution using multi-head attention;
obtaining from the GAT a first output set of hidden representations;
receiving, at a Convolutional Neural Network (CNN), at least some of the data;
obtaining from the CNN a second output set of hidden representations;
concatenating the first and second output sets of hidden representations to obtain a concatenated set of representations; and
detecting whether an anomaly exists using the concatenated set of representations and a third neural network, which receives the concatenated set of representations as an input.

15. The non-transitory computer-readable medium or media of claim 14, wherein the objects are at least one of components on a printed circuit board or sub-components within components on the printed circuit board, and connections between the components or sub-components are traces.

16. The non-transitory computer-readable medium or media of claim 15, wherein the GAT uses local neighborhood information that is based on proximity between the nodes to extract high level representations of the objects in the graph to obtain spatial properties of the objects.

17. The non-transitory computer-readable medium or media of claim 16, wherein the GAT establishes neighbor relationships between the nodes by using filters to aggregate the local neighborhood information.

18. The non-transitory computer-readable medium or media of claim 14, wherein the CNN uses the data to perform a pixel-based convolution operation.

19. The non-transitory computer-readable medium or media of claim 14, wherein the CNN has been trained using pixel data from sub-images.

20. The non-transitory computer-readable medium or media of claim 14, wherein the data comprises at least one of a 2D surface image, a 2D X-ray image comprising sub-surface layers, and a 3D tomograph of 2D images generated using computer-aided tomography.

* * * * *